June 1, 1926.  
E. K. DEGENER  
CUSHION COUPLING  
Filed Nov. 22, 1924  
1,586,881  
2 Sheets-Sheet 1
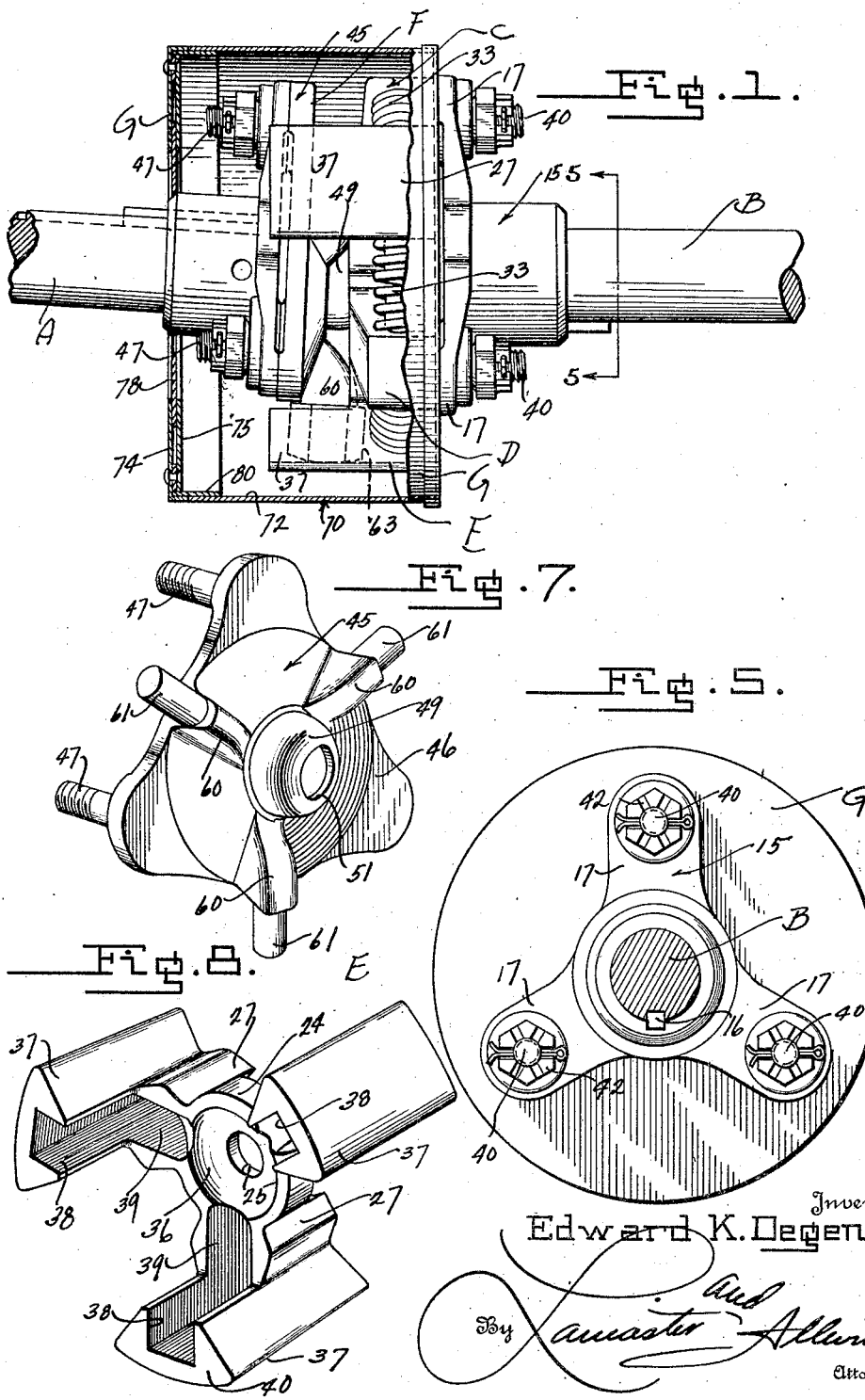
Inventor  
Edward K. Degener  
By Lamaster and Allwine  
Attorneys

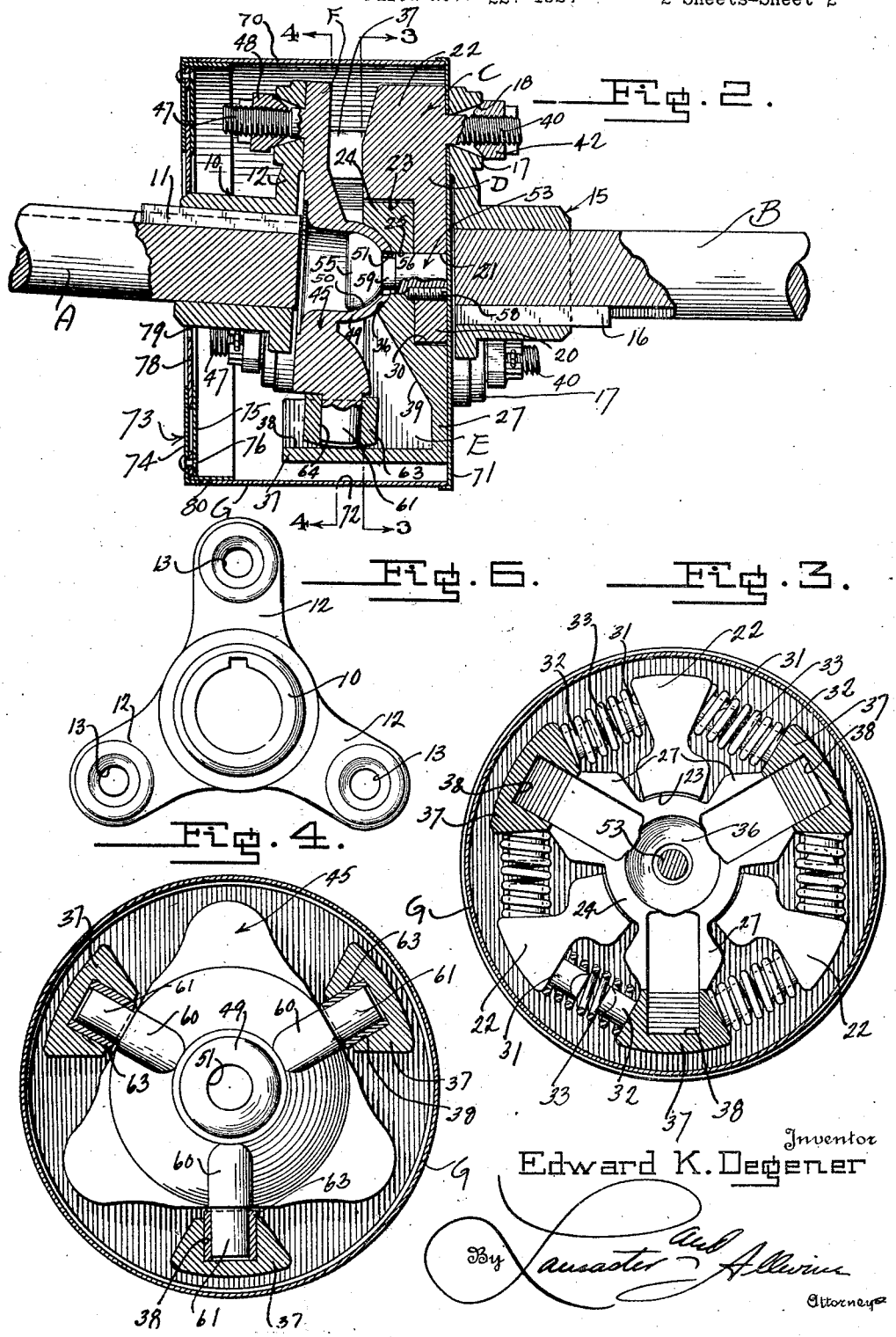

Patented June 1, 1926.

1,586,881

UNITED STATES PATENT OFFICE.

EDWARD K. DEGENER, OF SANTA ANA, CALIFORNIA.

CUSHION COUPLING.

Application filed November 22, 1924. Serial No. 751,611.

This invention relates to improvements in cushion couplings.

The primary object of this invention is the provision of an improved cushion coupling, somewhat analogous to my improved cushion coupling set forth in United States application Serial Number 686,915, filed January 17, 1924, and embodying specific improvements thereover in the provision of means to more effectively connect drive and driven shafts for proper universal jointed movement.

A further object of this invention is the provision of an improved universal joint structure, operating on a novel principle, embodying a very durable driving connection, and means to cushion the driving shock incident to transmission of power from drive to driven shafts.

A further object of this invention is the provision of an improved housing for universal joint structures of the character to be described.

Other objects and advantages of this invention will be apparent during the course of the following detailed description.

In the accompanying drawings, forming a part of this specification, and wherein similar reference characters designate corresponding parts throughout the several views, Figure 1 is a side elevation showing the improved cushion coupling connecting drive and driven sections of shafts, showing in section the improved joint housing.

Figure 2 is a cross sectional view taken through the improved cushion coupling and associated shaft sections.

Figures 3 and 4 are cross sectional views taken substantially on their respective lines designated in Figure 2 of the drawing.

Figure 5 is a cross sectional view taken substantially on the line 5—5 of Figure 1.

Figure 6 is a side elevation of a spider member adapted for quick detachment to a shaft.

Figures 7 and 8 are perspective views of details of the invention.

In the drawings, wherein for the purpose of illustration is shown only a preferred embodiment of the invention, the letters A and B may designate drive and driven sections for shafts, connected by the improved cushion coupling C. The cushion coupling C may include a member D rigidly connected with the driven shaft B, and with which an intermeshing member E, which may be termed an intermediate member, is resiliently connected, somewhat after the manner set forth in my copending application above referred to. The drive shaft section A is connected by a universal joint structure by means F to the shaft section B and intermediate member E.

The drive shaft A upon the conventional automotive vehicle is directly connected to the engine clutch mechanism, and has a conventional attaching spider 10 keyed, as at 11, upon the outer end thereof. The spider 10 preferably provides the triadically arranged arms or extensions 12 having tapered openings 13 therethrough. Similarly, the driven shaft B is provided with an attaching spider 15, which is keyed or otherwise secured thereto, as at 16, and which provides the triadically arranged arm 17 having the tapered openings 18 therein. The driven shaft B is, of course, connected to the differential mechanism, in conventional automotive vehicle construction.

The members D and E are interfitting, and are of spider formation. Spider or member D preferably provides a central hub portion 20, having an opening 21 therein, and is provided with the radially extending arms 22, preferably three in number, arranged at equal degrees about the axis of the hub 20. The arms 22 are preferably thicker than the hub portion 20 of the spider or member D, extending laterally from the plane provided by the hub portion 20, and thus providing a pocket or recess 23, so to speak, centrally between the laterally extending portions of the arm 22, and which is adapted to receive therein the hub portion 24 of the intermediate member E.

The member E has the hub 24 thereof provided with a central opening 25, which is adapted to be aligned with the opening 21 of the hub 20 above mentioned, and the intermediate member E is also provided with triadically arranged radially extending arms 27. These arms 27 are greater in thickness than the hub 24 of the member E, being offset rearwardly and between the extending portions thereof providing a pocket 30, so to speak, which receives the hub portion 20 of the member D above described, substantially as is illustrated in the drawings. In this manner, the members D and E are interfitting, in that the hub portions 20 and 24 may be placed in abutting opening aligning relation, with the arms 22 and 27 alternately arranged in the same plane.

It is preferred that the members D and E be connected for resilient axial movement, of a limited nature, and to this end the arms 22 and 27 are provided with lateral aligning extensions 31 and 32 respectively, adapted to receive thereover compression springs 33, normally under a sufficient compression to maintain the arms of the members D and E in spaced centered relation, so that the members D and E will admit of some relative movement before the arms 22 and 27 engage in a metal to metal contact, to prevent any further amplitude of movement, in accordance with that feature of the invention set forth in my copending application above referred to.

The member E centrally thereof is provided with the concaved socket 36, axially disposed with the opening 25, inwardly of one side of the hub 24. At the outer ends of each of the arms 26, said arms are provided with right angled extension portions 37, and these extension portions are provided with channel shaped grooves 38 extending longitudinally therealong, at the facing sides thereof, and which channel grooves 38 extend into grooves 39 provided in the arm portions 27 radially of the hub 24. The grooves 38 and 39 provide L-shaped grooves for each arm of the member E, which are adapted to receive universal pivoting arrangements of the means F to be subsequently described. The grooves 38 open at the outer edges 40 of the extension portions 37 of arms 27, and it is to be noted that each extension 37 projects at right angles from the arms 27 to the same side of the hub 24 as that at which the socket 36 is provided.

The member B is adapted to be rigidly connected with the spider 15 of the shaft B, and to this end rearwardly extending screw threaded shanks 40, preferably three in number are provided, which are adapted to extend through the openings 18 of the spider 15, when the cushion coupling C is assembled to the shaft sections A and B, and clamping nuts 42 are provided for engaging these screw threaded shanks 40 and securing them to the spider arms 17 of the spider 15.

Referring to the means F, the same includes a member 45, providing a substantially triangular shaped plate portion 46, at one side thereof having right angled screw threaded shanks 47, adapted for extension through the openings 13 in the spider arms 12, to receive nuts 48, by means of which to rigidly clamp the member 45 to the drive section A. At the opposite side or face of the plate 46 from the screw threaded shanks 47, it is preferred to provide a central hollow hemispherical projection 49, which provides a socket opening 50 therein opening at the side of the plate from which the screw threaded shanks 47 project. A reduced opening 51 is also provided axially of the member 45, at the end of the spherical projection 55. The projection 49, in fact provides the socket opening 50 to receive a member 53, by means of which the member 45 is pivotally connected to the members D and E and to hold the drive and driven shaft sections A and B in proper end facing relation. This member 53 includes the head portion 55 which fits in the socket opening 50, and is provided with a shank 56 disposed through the aligning openings 21 and 25 of the members D and E respectively, and being keyed to the member D by means of a short screw or key 58. This key 58 does not key the member 53 to the member E, so that the latter is free to move axially with respect to the member D. Adjacent the head 55, the shank 56, is provided with an annular groove 59, into which the margin portions of the hemispherical socket 49, about the opening 51 extend, as the member 45 is pivotally swung with respect to the members D and E and the stationary shank or pivoting member 53.

At the side of the triangular plate 46 facing the intermediate member E, it is preferred to provide radial-extensions 60, which are provided with cylindrical shaped reduced shanks 61 at the outer ends thereof, radially disposed with respect to the axis of the member 45, and which project outwardly of the marginal edges of the plate 46, for rotatably receiving pivoted guide blocks 63. The pivoted guide blocks 63 are preferably rectangular in formation, having transverse openings 64 therein to pivotally receive the shanks 61, and they are of just sufficient width to ride in the grooves 38 provided in the arms of the member D.

When the members D, E and 45 are connected as above mentioned to each of the shaft sections A and B, it can be readily understood that the means F, which includes the member 45 and the pivoted block 63, provides a structure by which the shaft section A is universally connected in a jointed relation with respect to the shaft section B. Upon movement of the sections A and B, when they are out of axial alignment, the socket or hemispherical shaped portion 49 will pivot on the head 55 which retains the same in place, so that the shaft sections A and B are always accurately maintained in their proper end facing relation. The blocks 63 may slide back and forth in their respective grooves 38, and the projection 60 may be received in the groove portion 39 of the arm 27, without hitting against the arms of the intermediate member E. The shanks 61 of the member 45 pivot in the members 63, notwithstanding that each of the members 63 moves in a defined path in its groove 38, and thus providing a universal connected arrangement of a novel character.

In order to maintain the movable details of the improved universal joint structure C in properly lubricated condition, it is preferred to provide a novel housing G therefor, which consists of a substantially cylindrical shaped body portion 70, provided with a rear wall 71, clamped by means of the shanks 40 and bolts 42 between the member D and the spider 15, in the position shown, so that the details of the universal joint structure C are disposed in the compartment 72 of the cylindrical body 70. The wall 71 is imperforate except for the openings through which the screw threaded shanks 40 extend, and is leak-proof in so far as lubricant contained in the compartment 72 is concerned. It is preferred to provide a closure 73 for the cylindrical body 70, as a part of the housing G, and which consists of spaced outer and inner wall portions 74 and 75, connected in spaced relation as by means 76. These walls 74 and 75 are ring shaped in formation, providing a central opening across which a substantially ring shaped sliding closure 78 is disposed. The sliding closure 78 slides in a space between the walls 74 and 75, and at the center thereof provides an opening 79, preferably receiving the hub of the spider 10 therein, substantially in lubricant sealing relation. Between the outer and inner walls 74 and 75 is clamped an annular retaining flange 80 which is adapted to be inserted in the forward end of the cylindrical body 70, in frictional engaging relation therewith, whereby to provide for the mounting of the closure 73. Additional securing means may also be provided for connecting the closure 73 in proper relation on the body 70, in accordance with any approved construction.

The operation of the universal joint structure in the housing G will be readily understood. The body portion of the housing, as is readily obvious is rigid with the driven shaft section B, and the drive shaft section A may move relative to the housing, incident to the fact that the closure ring 78 of the closure 73 slides in the space between the ring shaped walls 74 and 75, to permit the universal jointed movement of the shaft sections A and B.

From the foregoing description of the operation of this invention, it is believed that the advantages of the improved universal joint structure will be apparent. It not only provides a very durable joint structure, but embodies a compact arrangement for taking up the initial shock incident to application of power to the drive shaft section. Incident to the novel centrally disposed pivotal connection provided by the pin or pivot member 53 operating in the socket 49, the shaft section A is at all times kept in true driving relation with respect to the driven shaft section B, and vice versa.

Various changes in the shape, size, and arrangement of parts may be made to the form of invention herein shown and described, without departing from the spirit of this invention or the scope of the claims.

I claim:

1. In a universal joint the combination of a pair of members, means centrally pivoting said members in a positive connected relation, means connecting said members together laterally of said central pivotal connection so that said members may be moved universally, a pair of shafts, means fixedly connecting one of said shafts with one of said members, and means resiliently connecting the other of said shafts with the other of said members.

2. In a cushion coupling the combination of a pair of shaft sections, a member rigid with one of said shaft sections, a central pin carried by said member axially of the shaft section connected to said member, a second member rigidly connected to the other of said shaft sections and providing radially extending shanks, an intermediate section resiliently connected with the first mentioned member, ball and socket means provided in said second member and said intermediate member providing a pivotal connection held in such relation by said pin, said intermediate member providing grooves therealong laterally of said pin and parallel to the axis provided by said pin, and blocks slidable in said grooves pivotally receiving said radial shanks therein whereby said shafts are connected for universal pivoting.

3. In a cushion coupling of the class described the combination of a pair of shaft sections, a member rigidly connected with one of said shaft sections providing laterally extending spaced arms, a second member providing radially extending arms, spring means connected between the arms of the first mentioned member and the arms of the second mentioned member whereby to resiliently connect said members for limited amplitude of relative movement, projections carried at right angles by the arms of said second mentioned member providing grooves longitudinally therealong at right angles to the arms on which said projections are provided, a pin centrally carried by said first mentioned member extending through said second mentioned member and providing a ball head, said second mentioned member centrally about said pin providing a socket therein, a third mentioned member hingedly connected to the other shaft providing a hollow substantially hemispherical portion pivotally connected in the socket of the second member with the ball head of said pin engaged therein whereby to pivotally connect the third member with the first and second members, said third member providing radially extending pins, and blocks pivotally connected on said radially extending pins at their outer ends, said blocks being slidably mounted in the grooves of said second member for longitudinal sliding movement therein.

4. In a universal joint the combination of a shaft section, a pair of members, means fixedly connecting one of said members to said shaft section in radially extending relation therefrom, means pivotally supporting the other member on said shaft section for limited movement in a plane at right angles to the axis of said shaft section, means resiliently connecting said members, a second shaft section, and means universally pivoting the second shaft section with said member which is pivotally associated with the first mentioned shaft section for driving connection of the shaft sections.

5. In a universal joint a shaft section, a spider connected with the shaft section at an end thereof having radially extending arms, a member detachably connected with said arms forwardly of the end of the shaft section, said member providing a plurality of radially extending arms, a pin connected to said member axially aligning with said shaft forwardly of the end of said shaft, a second member oscillatively pivoted on said pin, said second member providing a plurality of arms alternately arranged with the arms of the first mentioned member, resilient means between the arms of the first and second mentioned members for resiliently supporting the second member for limited resilient movement with respect to the first mentioned member, a second shaft, and means carried by the second shaft for universal jointed connection with the arms of the second member.

6. In a universal joint a shaft section, a spider connected with the shaft section at an end thereof having radially extending arms, a member detachably connected with said arms forwardly of the end of the shaft section, said member providing a plurality of radially extending arms, a pin connected to said member axially aligning with said shaft forwardly of the end of said shaft, a second member oscillatively pivoted on said pin, said second member providing a plurality of arms alternately arranged with the arms of the first mentioned member, resilient means between the arms of the first and second mentioned members for resiliently supporting the second member for limited resilient movement with respect to the first mentioned member, a second shaft, means carried by the second shaft for universal jointed connection with the arms of the second member, and means pivotally connecting the last mentioned means with the pin of the first mentioned shaft section.

EDWARD K. DEGENER.